United States Patent

Bieman et al.

[11] Patent Number: 5,959,425
[45] Date of Patent: Sep. 28, 1999

[54] VISION GUIDED AUTOMATIC ROBOTIC PATH TEACHING METHOD

[75] Inventors: Leonard H. Bieman, Farmington Hills; Gary J. Rutledge, Clarkston, both of Mich.

[73] Assignee: FANUC Robotics North America, Inc., Rochester Hills, Mich.

[21] Appl. No.: 09/172,836

[22] Filed: Oct. 15, 1998

[51] Int. Cl.[6] .................................................. G05B 19/41
[52] U.S. Cl. ............................... 318/568.15; 318/568.16; 318/568.13
[58] Field of Search ..................... 364/474.03, 474.02, 364/474.024, 474.31, 474.05, 474.37, 191; 395/93, 94, 80–99; 901/3, 47; 219/125; 318/576, 577, 568.13, 568.14

[56] References Cited

U.S. PATENT DOCUMENTS

| | | | |
|---|---|---|---|
| 4,146,924 | 3/1979 | Birk et al. ................................ | 364/513 |
| 4,616,121 | 10/1986 | Clocksin et al. . | |
| 4,761,596 | 8/1988 | Nio et al. ................................ | 318/568 |
| 4,812,614 | 3/1989 | Wang et al. . | |
| 4,831,316 | 5/1989 | Isiguro et al. ...................... | 318/568.13 |
| 4,835,450 | 5/1989 | Suzuki . | |
| 4,835,710 | 5/1989 | Schenelle et al. ....................... | 364/513 |
| 4,942,538 | 7/1990 | Yean et al. .............................. | 364/513 |
| 4,965,499 | 10/1990 | Taft et al. . | |
| 5,083,073 | 1/1992 | Kato ........................................ | 318/577 |
| 5,300,868 | 4/1994 | Watanabe et al. .................. | 318/568.13 |
| 5,321,353 | 6/1994 | Furness . | |
| 5,327,058 | 7/1994 | Rembutsu ........................... | 318/568.11 |
| 5,465,037 | 11/1995 | Huissoon et al. . | |
| 5,572,103 | 11/1996 | Terada . | |
| 5,608,847 | 3/1997 | Pryor . | |

*Primary Examiner*—William M. Shoop, Jr.
*Assistant Examiner*—Rita Leykin
*Attorney, Agent, or Firm*—Howard & Howard

[57] ABSTRACT

A method of controlling a robot system (20) includes using a camera (40) to generate a first, two-dimensional image of a marking (42) on a workpiece (32). A second, two-dimensional image of the marking (42) is generated from a second perspective. The two images are then used to generate a three-dimensional location of the marking in real space relative to the robot (22). Since the visible marking (42) corresponds to a desired path (48), the three-dimensional location information is used to automatically program the robot (22) to follow the desired path.

22 Claims, 2 Drawing Sheets

VISION GUIDED AUTOMATIC ROBOTIC PATH TEACHING METHOD

BACKGROUND OF THE INVENTION

This invention generally relates to a method for programming a robot to follow a desired path. More particularly, this invention relates to a method of programming a robot to move a tool along a desired path using visual information to complete the programming process.

Industrial robots are increasingly being used for a wider variety of applications. In most instances, it is necessary to "teach" the robot the path along which the robot must move to complete the desired operation. For example, in a welding application, the robot must be programmed to move into a number of successive orientations that will effectively move the welding torch along the seam on the workpiece.

Programming or teaching a robot a desired path conventionally has been carried out manually. An operator interacts with the robot controller and manually causes the robot to move into the necessary orientations for placing the tool into the necessary positions along the desired path. Each of the positions is then programmed into the robot controller, which later repeats the programmed path. The process is typically time-consuming, difficult and often not accurate enough to yield satisfactory results at the end of the robot operation. Further, the conventional practice includes the drawback of having the operator within the robot work space during the teaching operation, which introduces the possibility for an undesirable collision between the robot and the operator.

Several systems have been proposed that include a robot vision system for controlling robot operation. None, however, have used the vision system to teach or program the robot to follow the program path. For example, U.S. Pat. Nos. 4,616,121; 4,965,499; and 5,572,103 each include a vision system associated with an industrial robot that provides visual information for making corrections to a preprogrammed path during robot operation. Such systems have been proposed for accommodating deviations between an actual desired path and a preprogrammed path that the robot is following. In each of these systems, however, it is necessary to preprogram the robot in the conventional manner.

There is a need to simplify and improve current robot path teaching methods. For example, it is desirable to eliminate the need for the operator to be within the robot work envelope during the path training procedure. Additionally, it is desirable to improve efficiency in teaching a robot path by reducing the amount of time required.

This invention addresses the needs described above while avoiding the shortcomings and drawbacks of the prior art. This invention provides a method of automatically teaching a robot path using visually acquired information regarding the desired path.

SUMMARY OF THE INVENTION

In general terms, this invention is a method of controlling a robot by automatically programming the robot to follow a desired path using a robot vision system to acquire data regarding the desired path and programming the robot based upon the acquired visual data.

The method of this invention includes several basic steps. First, a workpiece is marked with a visible marking indicating at least a portion of the desired path. A first, two-dimensional image of the line is generated by a vision system that observes the line from a first perspective. A second, two-dimensional image of the line is generated by the vision system from a second perspective. A three-dimensional location of the path relative to the robot is then generated using the first and second images of the line that was marked on the workpiece. The three-dimensional location of the path is then used to program the robot so that it moves a tool along the desired path.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
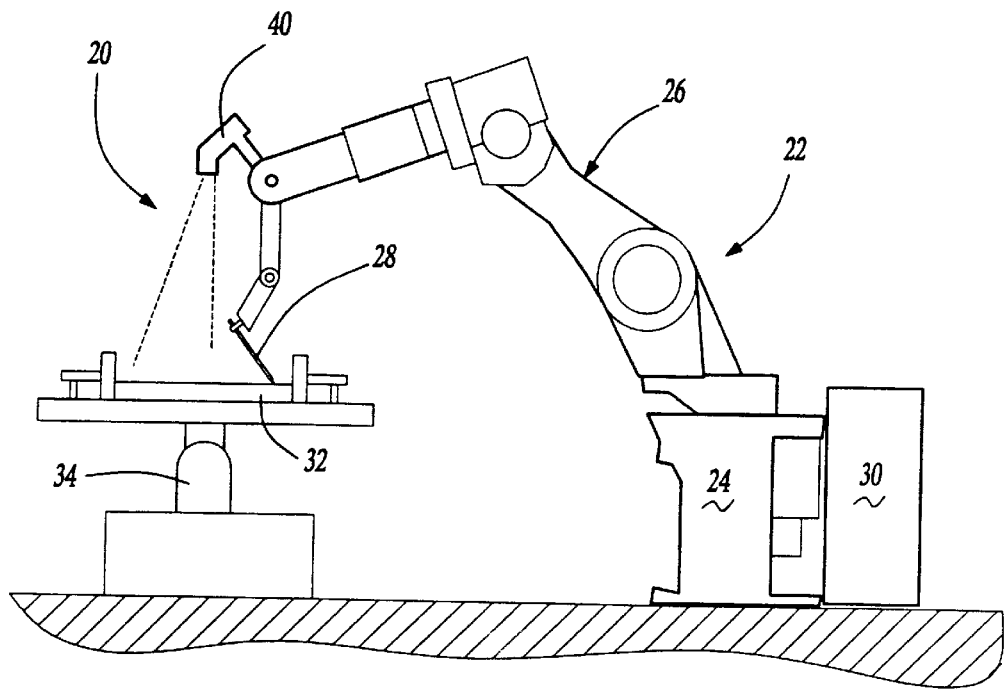
FIG. 1 is a diagrammatic illustration of a robot system designed according to this invention.

FIG. 1 diagrammatically illustrates a robot system 20 including a robot 22 that includes a robot base 24 and a moveable arm 26 supported on the base 24. One end of the arm 26 supports a tool 28 that is used to perform a desired operation. For example, the tool 28 could be a welding torch or an applicator for applying a sealant.

A controller 30 controls the movement of the robot arm 26 so that a desired operation is performed on a workpiece 32. The workpiece 32 is diagrammatically illustrated on a conventional support 34 within the robot work envelope.

A vision system includes a camera 40 that is supported on the robot arm 26 in the embodiment of FIG. 1. The camera 40 preferably is a digital camera that is capable of viewing the workpiece 32 and collecting data representing an image of what is observed by the camera 40. The camera 40 is in communication with the controller 30 so that the image information obtained by the camera 40 can be processed as described below. A variety of digital cameras are commercially available and those skilled in the art will be able to choose one to satisfy the needs of a particular situation.

Figure 2:
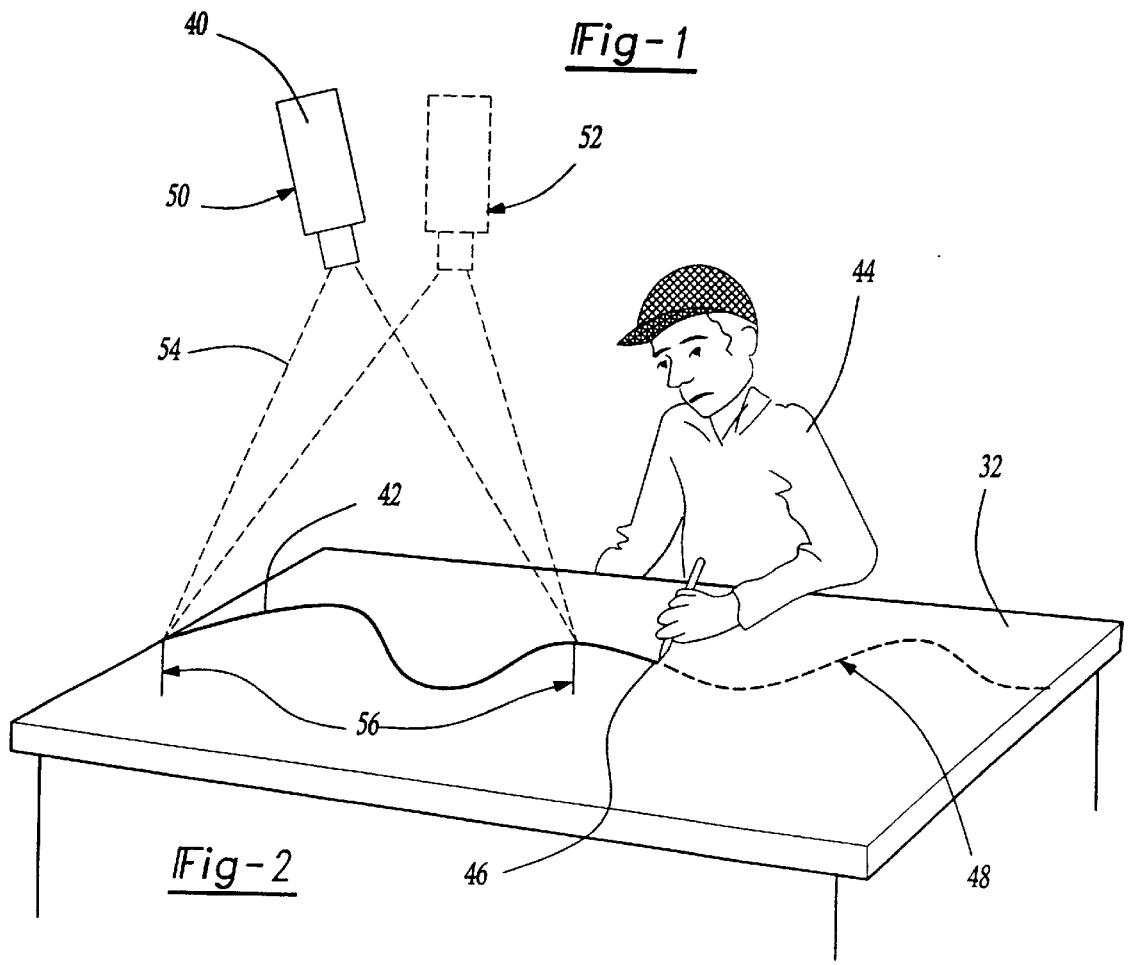
FIG. 2 is a diagrammatic illustration of a portion of the method of this invention.

FIG. 2 illustrates selected portions of the embodiment of FIG. 1. The workpiece 32 has a visible line 42 that is being manually marked by an operator 44 using a marker 46. The marker 46 can be any instrument for marking a visible line on the appropriate surface of the workpiece 32 such as a paintbrush or felt tip marking pen, for example. The line 42 provides a visible marking or indication of the desired path 48 on the workpiece 32. For purposes of illustration, the path 48 corresponds to a line where sealant should be applied to the surface of the workpiece 32.

Although an operator 44 is shown manually placing the line 42 onto the workpiece 32 in FIG. 2, the line 42 can be accomplished in a variety of ways. For example, a laser beam can be used to project a line along the surface of the workpiece 32 in a position that corresponds to the desired path. Alternatively, the workpiece 32 may include a contour that corresponds to the desired path. By selectively illuminating the workpiece 32, the contour can serve as the visible indication of the desired path 48. Moreover, a variety of visible markings including line segments, arrows or a series of other visible symbols can be used. A solid continuous line is only one example of a visible marking that is useful with this invention.

In one example, the line 42 is marked using a fluorescent substance. The workpiece 32 is then illuminated using ultraviolet light to cause the fluorescent material to fluoresce visible light that is detectable by the camera 40. Since the ultraviolet light will not be sensed by the camera 40, only the marked line will appear bright in the image obtained by the camera 40.

In all embodiments, it is most desirable to provide a line 42 using a material or illuminating strategy that provides a high contrast so that the line 42 is clearly discernible to the camera 40.

After the operator 44 completes the line 42 to correspond to the entire path 48, the operator can exit the robot work envelope. Then the camera 40 is used to obtain two-dimensional images of the line 42. In the embodiment of FIG. 2, the camera 40 is illustrated in a first position 50 where it obtains an image of the line 42 from a first perspective. The camera 40 is later moved into another position (illustrated in phantom at 52) to obtain a second image of the line 42 from a second perspective.

In the illustrated embodiment, the camera 40 has a field of vision 54. The field of vision 54 is not large enough for the camera 40 to observe the entire line 42 all at one time. Therefore, the camera 40 obtains an image of a segment 56 from the first perspective in the first position 50. The camera 40 is then moved to obtain a second image of the same segment 56 from a second perspective. In the preferred embodiment, the camera 40 is moved to successively obtain image information regarding adjacent segments of the line 42 until the entire line has been imaged from two perspectives.

Each image obtained by the camera 40 is a two-dimensional representation of the line 42. The camera 40 preferably is digital and collects digital information representing the line 42 in two dimensions. The two-dimensional information from each perspective is then used to determine a three-dimensional location of the path 48 relative to the robot base 24.

The camera 40 is calibrated so that the image information obtained through the camera has a known relationship to the robot base 24 in real space. Conventional stereo techniques are used to convert the two-dimensional image data from two different perspectives to determine the three-dimensional location of the path on the workpiece 32. The three-dimensional location information is then used to automatically program the robot 22 so that the robot arm 26 moves in a pattern that will move the tool 28 along the desired path 48 as required for a particular operation.

In the embodiment of FIG. 1, the camera 40 is mounted on the robot arm 26. Therefore, moving the camera 40 into a variety of positions to obtain images of the line 42 from different perspectives preferably is accomplished by moving the robot arm 26. This can be done manually by an operator without requiring the operator to be present within the robot work envelope or automatically if the robot is programmed accordingly. It is important to note that at least two images from two different perspectives for the entire line 42 are obtained to generate the three-dimensional representation of the path 48 in real space. In some applications, it may be desirable to obtain three or more different images from different perspectives and then use all of them for determining the three-dimensional location of the path 48.

Alternative embodiments include obtaining the three-dimensional information by techniques that differ from extracting the three-dimensional information from stereo images. A variety of known techniques can provide three-dimensional information including imaging scanned laser dots or lines, moiré interferometry, and time of flight laser systems (which are sometimes referred to as LADAR or LIDAR). These techniques are examples that can be used in a system designed according to this invention. It is within the scope of this invention to utilize such a three-dimensional information gathering technique in conjunction with a two-dimensional image that provides the location of the marking 42 on the workpiece.

In some embodiments, it is useful to utilize raised or indented markings on a surface as the marking 42. In such embodiments, the location of the desired path preferably is obtained from three-dimensional data, which can be gathered through any of the techniques mentioned in the previous paragraph, and does not rely upon obtaining any two-dimensional images.

Figure 3:
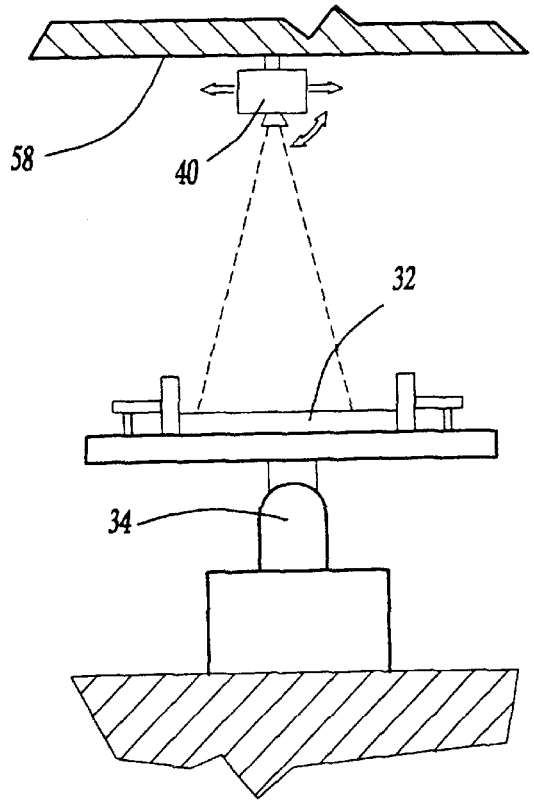
FIG. 3 is a diagrammatic illustration of another embodiment designed according to this invention.

FIG. 3 diagrammatically illustrates an alternative embodiment to that shown in FIG. 1. Only selected components are shown in FIG. 3 for simplicity. The camera 40 is not mounted on the robot 22 but, instead, is supported on a rail 58 that is positioned near the robot work envelope. The camera 40 is moveable along the rail 58 as shown by the arrows in FIG. 3. The camera 40 can be moved linearly or pivoted relative to the rail 58 so that the camera 40 can obtain more than one image from more than one perspective of the line 42 marked on the workpiece 32.

Another alternative would be to mount more than one camera in fixed positions, respectively, to observe the line 42. Each camera is used for obtaining a separate image from a different perspective. The two-dimensional image information then is used to generate the three-dimensional location as described above.

Figure 4:
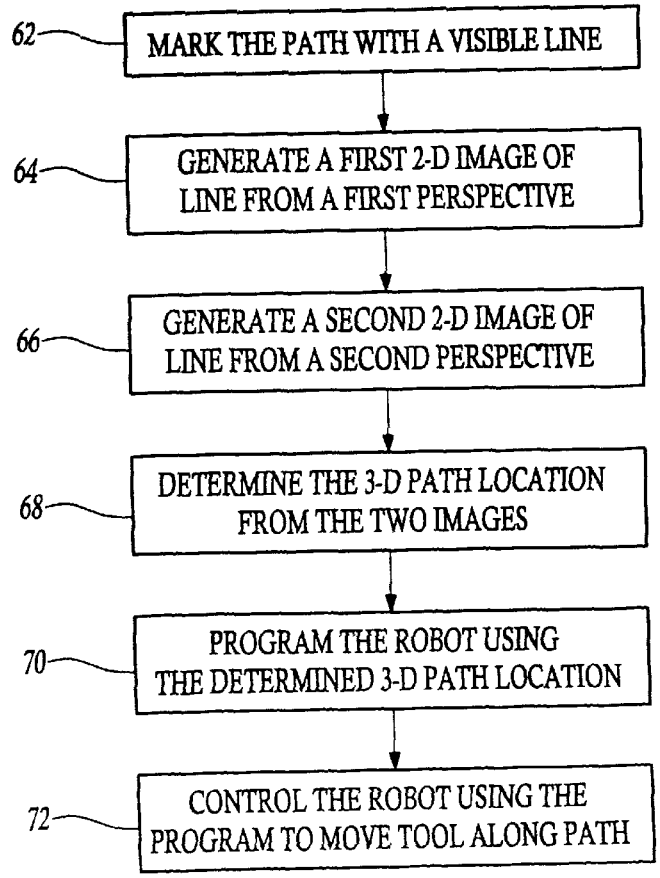
FIG. 4 is a flow chart diagram summarizing the method of this invention.

FIG. 4 summarizes the method of this invention in flow chart form. The flow chart 60 includes several basic steps that preferably are sequentially completed to program the robot to follow a desired path. The first step at 62 is to mark the desired path by placing a visible line on the workpiece. As discussed above, the visible line can be accomplished in a variety of ways. Then at 64 a first, two-dimensional image of the line is generated from a first perspective. The first image is generated by obtaining a visible representation of the line using a camera and then processing the set of data available from the camera that describes the image obtained. At 66 a second, two-dimensional image of the line, observed from a second perspective, is generated.

Both two-dimensional images are then used at 68 to generate a three-dimensional path location. Conventional stereo techniques, as understood by those skilled in the art, preferably are used to convert the information from the images into a three-dimensional set of data representing the location of the desired path relative to a robot reference frame, which typically is associated with the base 24. The three-dimensional data is then used by programming module to program the robot at 70 so that the robot controller 30 will be able to control the robot arm 26 so that it moves the tool 28 along the desired path. In this manner, the programming or teaching of the path is accomplished automatically. The need for manually teaching a robot to move along a desired path is eliminated by this invention. Lastly, at 72 the controller 30 controls the robot using the program, which is based upon the determined three-dimensional information, and the robot moves the tool 28 along the desired path 48.

This invention provides a number of significant advantages including eliminating the need for manually teaching a robot to follow a desired path. The method of this invention is applicable for a variety of applications and can be readily implemented by appropriately programming commercially available robot controllers.

Further, the method of this invention is safe and easy for an operator to implement. The operator simply defines the robot path on the workpiece with a marker that provides a visible line. The vision system then obtains more than one image of the line from more than one perspective. This can be accomplished in a variety of manners as described above. Throughout the actual teaching operation, the operator can be safely outside of the robot work envelope.

Moreover, this invention is readily applicable to a variety of robot systems. In many situations, the only necessary modification is to include a camera on the robot and to appropriately program the camera and controller to implement the algorithms necessary to complete the computations associated with converting the two-dimensional images into three-dimensional information.

Given this description, those skilled in the art will be able to choose from among commercially available microprocessors, software and/or custom design software to realize the necessary control functions to accomplish this invention.

The preceding description is exemplary rather than limiting in nature. Variations and modifications to the disclosed embodiment may become apparent that do not necessarily depart from the purview and spirit of this invention. The scope of legal protection is limited only by the following claims.

We claim:

1. A method of controlling a moveable robot arm that is supported by a robot base to move a tool supported on the robot arm along a path on a workpiece, comprising the steps of:
   (A) marking the workpiece with a visible marking indicating at least a portion of the path;
   (B) generating a first two-dimensional image of the marking from a first perspective;
   (C) generating a second two-dimensional image of the marking from a second perspective;
   (D) generating a three-dimensional location of the path relative to the robot base using the first and second images; and
   (E) moving the tool along the path using the three-dimensional location of the path from step (D).

2. The method of claim 1, wherein step (E) includes programming the robot to move the robot arm into a plurality of successive positions that will move the tool along the path and wherein the programming is done using the three-dimensional location of the path from step (D).

3. The method of claim 1, wherein step (D) includes determining a relationship between the first and second images and determining the three-dimensional location of the marking based upon the determined relationship.

4. The method of claim 3, wherein step (D) is performed using stereo techniques.

5. The method of claim 1, wherein step (B) includes obtaining a first set of visual data representing the marking from the first perspective and generating the first two-dimensional image from the first set of visual data and wherein step (C) includes obtaining a second set of visual data representing the marking from the second perspective and generating the second two-dimensional image from the second set of visual data.

6. The method of claim 5, wherein step (B) is performed using a camera in a first orientation relative to the marking and wherein step (C) is performed using a camera in a second orientation relative to the line.

7. The method of claim 5, wherein step (B) is performed using a first camera and step (C) is performed using a second camera.

8. The method of claim 1, wherein steps (B) and (C) include using a camera to obtain visual data of the marking and the method includes the step of moving the camera into a first position to perform step (B) and then moving the camera into a second position to perform step (C).

9. The method of claim 8, including the step of supporting the camera on the robot arm and moving the robot arm into a first orientation to perform step (B) and then moving the robot arm into a second orientation to perform step (C).

10. The method of claim 1, wherein step (A) includes marking the workpiece with a line that extends along the entire path and wherein steps (B) and (C) are successively performed on successive segments of the entire line and wherein step (D) includes generating a three-dimensional location of the entire path.

11. The method of claim 1, wherein step (A) includes painting a line on the workpiece.

12. The method of claim 1, wherein step (A) includes selectively illuminating a contour on the workpiece to thereby generate a visible line on the workpiece wherein the contour corresponds to the path.

13. The method of claim 1, wherein step (A) includes placing a fluorescent substance on the workpiece and wherein the method includes illuminating the workpiece using ultraviolet light.

14. A system for controlling a robot to move a tool along a path on a workpiece, comprising:
   a robot base;
   a moveable robot arm supported by said base and having a tool supported by said arm;
   a controller that controls movement of said arm;
   a marker that is adapted to make a visually detectable marking on the workpiece that corresponds to the path;
   a camera for obtaining a first image of the marking from a first perspective and a second image of the marking from a second perspective;
   means for determining a three-dimensional location of the path relative to said base from the first and second images; and
   programming means for generating a programmed path using the three-dimensional location of the path and for programming said controller with the programmed path so that the controller controls the robot arm to move the tool along the path.

15. The system of claim 14, wherein said camera is supported on said arm and wherein said controller controls said arm to move into a first orientation where said camera obtains the first image and then controls said arm to move into a second orientation where said camera obtains the second image.

16. The system of claim 14, including a first camera that obtains the first image and a second camera that obtains the second image.

17. The system of claim 14, wherein said determining means comprises software.

18. The system of claim 14, wherein said programming means comprises software and a programming module in communication with said controller.

19. A method of controlling a moveable robot arm that is supported by a robot base to move a tool supported on the robot arm along a path on a workpiece, comprising the steps of:

(A) marking the workpiece with a visible marking indicating at least a portion of the path;

(B) generating a two-dimensional image of the marking;

(C) generating a three-dimensional image of the workpiece surface upon which the visible marking was marked;

(D) generating a three-dimensional location of the path relative to the robot base using the two-dimensional image and the three-dimensional image; and (E) moving the tool along the path using the three-dimensional location of the path from Step (D).

20. A method of controlling a moveable robot arm that is supported by a robot base to move a tool supported on the robot arm along a path on a workpiece, comprising the steps:

(A) marking the workpiece with a three-dimensional marking indicating at least a portion of the path;

(B) generating a three-dimensional image of the workpiece surface upon which the markings were marked;

(C) generating a three-dimensional location of the path relative to the robot base using the three-dimensional image; and (D) moving the tool along the path using the three-dimensional location of the path from Step (C).

21. The method of claim 20, wherein step (A) includes using markings that are indented relative to the workpiece surface.

22. The method of claim 20, wherein step (A) includes using markings that are raised relative to the workpiece surface.

* * * * *